United States Patent
Bares

(12) 
(10) Patent No.: US 12,102,076 B2
(45) Date of Patent: Oct. 1, 2024

(54) FISHING BAIT CARTRIDGE

(71) Applicant: Mark F Bares, West Fargo, ND (US)

(72) Inventor: Mark F Bares, West Fargo, ND (US)

( * ) Notice: Subject to any disclaimer, the term of this patent is extended or adjusted under 35 U.S.C. 154(b) by 28 days.

(21) Appl. No.: 17/725,933

(22) Filed: Apr. 21, 2022

(65) Prior Publication Data

US 2023/0337650 A1     Oct. 26, 2023

(51) Int. Cl.
*A01K 97/04*     (2006.01)

(52) U.S. Cl.
CPC .................. *A01K 97/04* (2013.01)

(58) Field of Classification Search
CPC ........ A01K 97/04; A01K 97/06; A01K 97/00; B65D 83/04
USPC ........................................................ 43/54.1
See application file for complete search history.

(56) References Cited

U.S. PATENT DOCUMENTS

| | | | |
|---|---|---|---|
| 1,896,827 A * | 2/1933 | Neely ...................... | B65D 3/24 |
| | | | 229/120.35 |
| 2,076,157 A | 4/1936 | Perkins et al. | |
| 2,763,956 A | 2/1955 | Olson | |
| 2,814,904 A * | 12/1957 | Allen ..................... | A01K 97/06 |
| | | | 43/54.1 |
| 2,883,788 A * | 4/1959 | Stitt ....................... | A01K 97/04 |
| | | | 43/55 |
| 3,006,106 A | 10/1961 | Schuler | |
| 3,245,172 A | 4/1966 | Hawks | |
| 3,308,570 A * | 3/1967 | Horton .................... | A01K 97/04 |
| | | | D22/136 |
| 3,430,379 A * | 3/1969 | Wolfrum ................ | A01K 97/06 |
| | | | 43/57.1 |
| 3,975,853 A | 8/1976 | Aaron | |
| 4,030,226 A | 6/1977 | Shelton, Sr. et al. | |
| 4,207,993 A * | 6/1980 | Ellis, Sr. ................ | A01K 97/04 |
| | | | 221/256 |
| 4,483,092 A | 11/1984 | Steiner | |
| 4,815,230 A * | 3/1989 | Allen ..................... | A01K 97/04 |
| | | | 43/55 |
| 5,103,585 A * | 4/1992 | Pleasants ............... | A01K 97/04 |
| | | | 43/55 |
| 2015/0157002 A1 | 6/2015 | Paquette | |

FOREIGN PATENT DOCUMENTS

| | | | | |
|---|---|---|---|---|
| GB | 2186269 A | * | 8/1987 | ................ A61J 7/04 |
| GB | 2392074 A | * | 2/2004 | ............ A01K 97/06 |

* cited by examiner

*Primary Examiner* — Timothy D Collins
*Assistant Examiner* — Maria E Graber
(74) *Attorney, Agent, or Firm* — Fargo Patent & Business Law; Thomas Kading

(57) ABSTRACT

The present application discloses a fishing bait cartridge that may contain fishing bait. A cartridge may be loaded with bait. Bait in the cartridge may be stored in individual cells. The cartridge allows for bait to be removed from a cell by a hook. A bait being removed from a cell allows for the bait to be installed on a hook without a fisher being required to touch the bait. The cartridge may be configured in size and shape to allow for the cartridge to fit within a fisher's pocket. The cartridge may be configured to work with a variety of bait types and containers.

16 Claims, 14 Drawing Sheets

FISHING BAIT CARTRIDGE

CROSS-REFERENCE TO RELATED APPLICATION(S)

None.

BACKGROUND

Fishing techniques often employ natural baits, such as living or dead animals, including minnows, worms, leeches, shrimp, crawfish, or any other bait. Fishermen also employ artificial fishing baits. Often fishing bait is stored in a container until the fisher desires to use the bait. At this time, the fisher must remove the bait from the container.

Fishing activity may be performed in many different temperate regions. There are many different forms of fishing. For example, there is ice fishing, shore fishing, boat fishing, and so forth. When a fisher is ice fishing or fishing in cold climates, the fisher's hands and fingers may become cold. A fisher may be considered a fisherman, a fisherwoman, or any other person who fishes. Cold hands and fingers may result in difficulty for a fisher to install bait on a hook. Further, if the fisher is wearing gloves, the size of the gloves may cause difficulty in installing a bait on a hook. Often, a fisher must remove their gloves to install a bait on a hook. Other fishers do not wish to simply touch the bait as they don't like to touch bait. Being able to simply not touch the bait may be enough motivation for someone to become a fisher.

Often fishing bait comes in packaging that includes many individual fishing bait items. For example, worms used as fishing bait may come in a container of multiple worms. The fisher may need to individually find and select a worm to install on a hook. This may require digging through a container of fishing bait. The container with multiple fishing bait items may be relatively large compared to the individual bait. A large container may be cumbersome to transport or store while fishing.

SUMMARY

The present application discloses a fishing bait cartridge that may contain fishing bait. The fishing bait cartridge may be referenced as the cartridge. A cartridge may be loaded or preloaded with bait. The bait in the cartridge may be stored in individual cells. The cartridge allows for bait to be removed from a cell by a hook. A bait being removed from a cell allows for the bait to be installed on a hook without a fisher being required to touch the bait. By allowing a fisher to install a bait on a hook without touching the bait, a fisher may be able to install a bait on a hook while wearing gloves. The cartridge may be configured in size and shape to allow for the cartridge to fit within a fisher's pocket.

The cartridge may be configured to work with a variety of bait types. For example, the cartridge may be configured to work with wax worms, grubs, earthworms, leaches, iron worms, minnows, insects generally, grasshoppers, crickets, synthetic bait, fake bait, and other bait types.

The cartridge may comprise a base with a first cell and a second cell, a vertical hook slot for each bait cell, and a top configured to interface with the base such that the base and the top may rotate relative to each other. The top may have an opening that may be adjustably located over a cell to allow for a hook to be inserted into the bait. By inserting the hook into a cell with a bait, the bait may be caused to be installed on the hook. The hook and the installed bait may be removed from the cell and used for fishing purposes.

BRIEF DESCRIPTION OF THE DRAWINGS

These and other features and advantages of the present invention will become more readily appreciated as the same becomes better understood by reference to the following detailed description when considered in connection with accompanying drawings, wherein.

DETAILED DESCRIPTION OF THE ILLUSTRATED EMBODIMENTS

General

The present invention will now be described with occasional reference to the specific embodiments of the invention. However, this invention may be embodied in different forms and should not be construed as limited to the embodiments set forth herein. Rather, these embodiments are provided so that this disclosure will be thorough and complete and fully convey the invention's scope to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to limit the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth, as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. However, any numerical values inherently contain certain errors necessarily resulting from error found in their respective measurements.

Figures Detail

Figure 1:
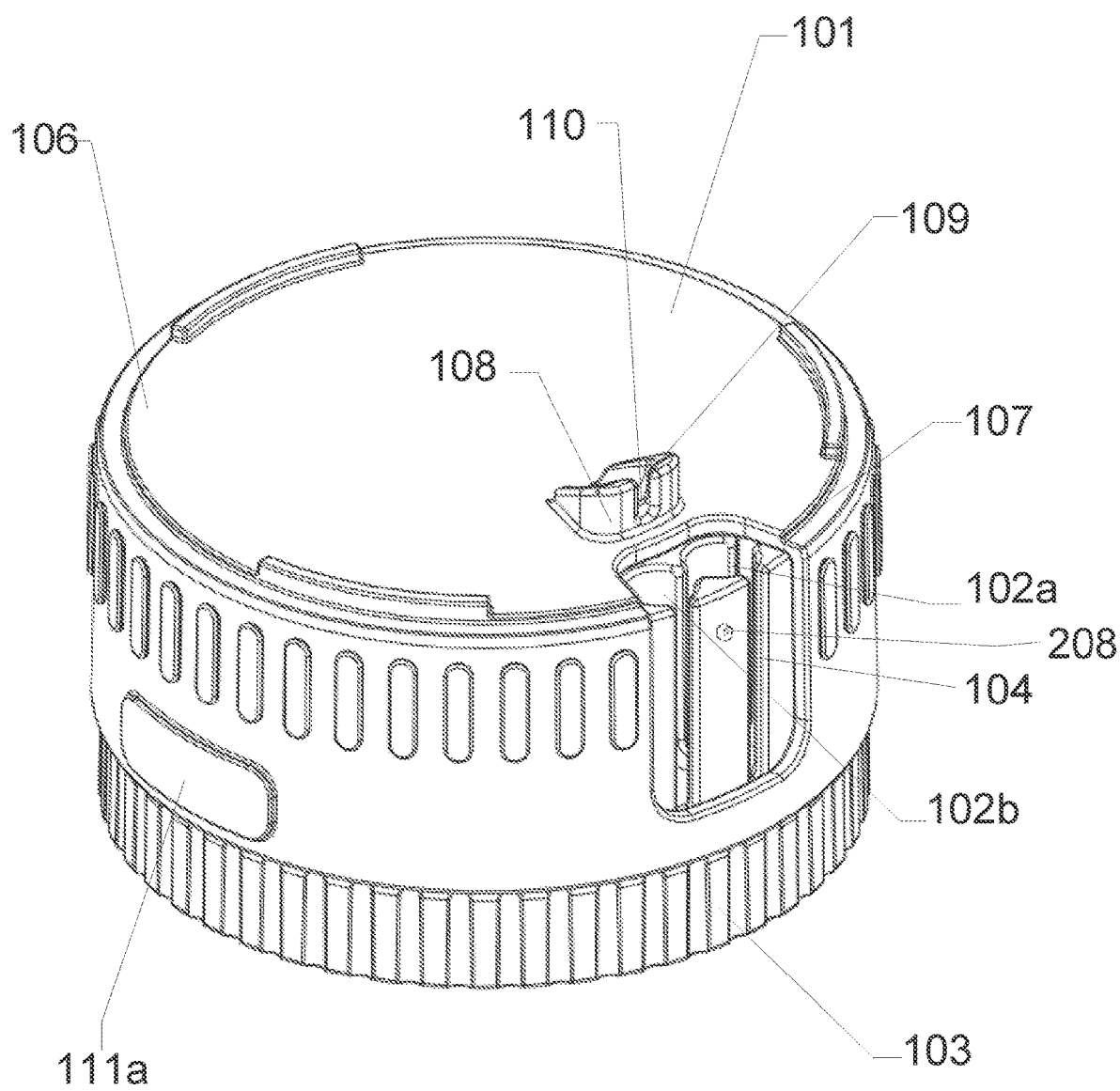
FIG. 1 shows a 3D perspective of a fishing bait cartridge.

FIG. 1 shows a 3D perspective of a fishing bait cartridge 101. The present application discloses a fishing bait cartridge that may contain fishing bait 401. The fishing bait cartridge may be referenced as the cartridge 101. A cartridge 101 may be loaded or preloaded with bait 401. Bait 401 in the cartridge may be stored in individual cells. Each cell 102 may be configured to store one or more bait 401 items. The cartridge 101 allows for bait 401 to be removed from a cell 102 by a hook 501. A bait 401 being removed from a cell 102 allows for the bait 401 to be installed on a hook 501 without a fisher being required to touch the bait 401. By allowing a fisher to install a bait 401 on a hook 501 without touching the bait 401, a fisher may be able to install a bait 401 on a hook 501 while wearing gloves. The cartridge 101 may be configured in size and shape to allow for the cartridge 101 to fit within a fisher's pocket and may be of size and shape appropriate for other types of baits or containers. The cartridge 101 may be configured such that it is manufactured from one or more pieces. As disclosure herein, the cartridge 101 may be constructed from two pieces in FIGS. 1-6, 12 and three pieces in FIGS. 7-11. Alternative embodiments may have more than three pieces, but as disclosed herein, the cartridge 101 may be constructed of only two or three pieces. Alternatively, the cartridge 101 may be constructed of more than three pieces or less than two pieces.

The cartridge 101 may be configured to work with a variety of bait 401 types. For example, the cartridge may be configured to work with wax worms, grubs, earthworms, leeches, iron worms, minnows, insects generally, grasshoppers, crickets, synthetic bait, fake bait, and other bait types. The cartridge 101 may be configured with holes that allow for circulation of fluid from the exterior of the cartridge 101 into the cartridge 101 interior and back out of the cartridge 101; a cartridge 101 that allows for circulation is considered permeable. A permeable cartridge 101 may be a constructed with holes in the base 103 and the top 106. In such version, the base 103 and the top 106 may be considered permeable. A permeable cartridge 101 may be used when the cartridge 101 is used to work, for example, with minnows and the cartridge 101 is stored in a larger container of water.

The cartridge 101 may be comprised of a base 103 with a first cell 102a, a second cell 102b, a vertical slot 104 for each bait cell, and a top 106 configured to interface with the base 103 such that the base 103 and the top 106 may rotate relative to each other. The first cell 102a, the second cell 102b, and any additional cells may be referenced as a cell 102. The top 106 may have an opening 107 that may be adjustably located over a cell 102 to allow for a hook 501 to be inserted. By inserting the hook 501 into a cell 102 with a bait 401 and into the bait 401, the bait 401 may be caused to be installed on the hook 501. The hook 501 and the bait 401 when installed on a hook 501 may be removed from the cell 102 and used for fishing purposes. The vertical slot 104 on the first cell 102a may be referenced as the first vertical slot and the vertical slot 104 on the second cell 102b may be referenced as the second vertical slot. A cartridge 101 with a first vertical slot may have one or more vertical slots. For example, a cartridge 101 with one vertical slot 104 may have a vertical arm that is essentially a solid wall on the exterior of the base 103 with one vertical slot 104. A cartridge 101 with multiple vertical slots may have multiple vertical slots.

The cartridge 101 may be comprised of many different types of materials. For example, plastics, metals, rubbers, and other appreciated materials may be used to construct the cartridge 101 components. The cartridge 101 components may also be constructed from multiple types of materials. The base 103, case 1001, or top 106 may be molded or constructed in one solid piece or in multiple pieces. For example, the base 103 may be injection molded or 3D printed as one object. The top 106 may have at least one release button 111 which a fisher may press to allow for easier removal of the top 106 from the base 103. A release button 111 may be referenced as a first release button 111a, a second release button 111b, or any other variation. For example, a first release button 111a could be located on the opposite side of the top 106 as a second release button 111b. If the tab 403 does not extend around the circumference of the top 106 and the tab 403 is only present at locations on the circumference that are opposite points 112 to the release buttons, pressure placed on the first release button 111a and the second release button 111b may cause the tab 403 to disengage from the notch 402, thereby allowing the top 106 to be removed from the base 103. The tab 403 and release button 111 may be configured alternatively. A bait stop 108 may be installed on the cartridge 101. The bait stop 108 may act as a surface upon which a fisher may press a bait 401 installed on a hook 501 so to adjust the placement of a hook 501 in a bait 401. For example, a fisher may desire to install the hook 501 further into the bait 401 or completely through the bait 401. A bait stop 108 may be comprised of a surface 109 and a hook pass 110. A bait 401 installed on a hook 501 may be pressed against the surface 109 causing the bait 401 to move relative to the hook 501 while the hook 501 may extend and move through the hook pass 110.

Figure 2:
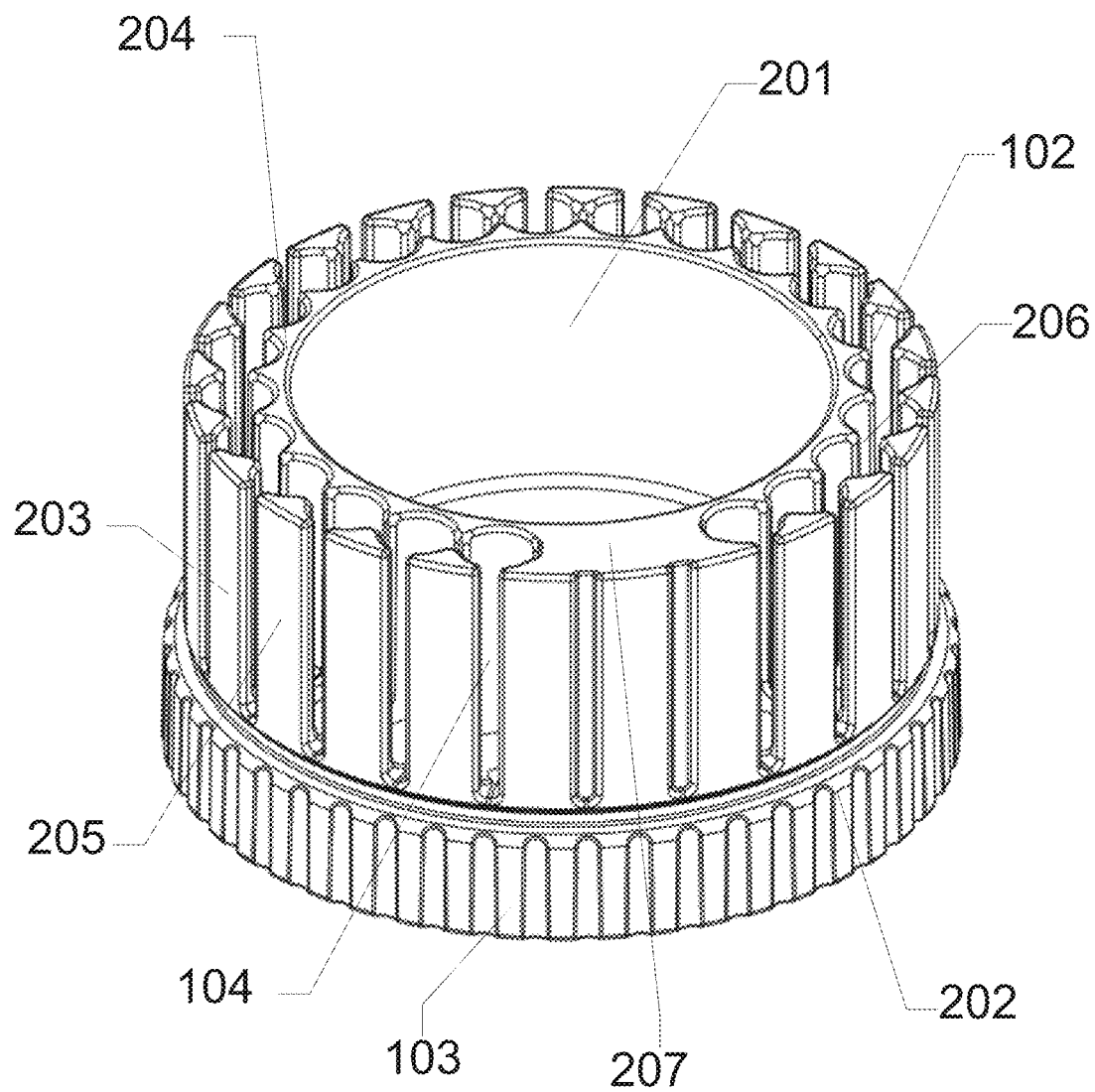
FIG. 2 shows a 3D perspective of a fishing bait cartridge base.

FIG. 2 shows a 3D perspective of a fishing bait cartridge 101 base 103. The base 103 is comprised of at least one cell 102. As shown in FIG. 2 there are 22 cells. A cartridge 101 may be configured with more cells or less cells. A cartridge 101 must have at least one cell 102. The base 103 may be further comprised of a central pocket 201. Additional bait 401 or other material may be stored in the central pocket 201. For example, extra bait and bait packing may be stored in the central pocket 201. Alternatively, other items may be stored. For example, additional hooks may be stored in the central pocket 201.

A strainer may be placed in the central pocket 201 to separate bait from bedding or other material in the central pocket 201. For example, bedding material might be stored with worms in the central pocket 201. The strainer may be a mesh or other material that separates the worms from the bedding.

The base 103 may have a vertical slot 104 for each individual cell 102. In FIG. 2, there are 22 vertical slots as there are 22 cells. The base 103 may be comprised of a floor 202 and an upper extension 203. The floor 202 encloses the bottom of the base 103. The floor 202 may have one or more holes that allow fluid or solids movement through the floor. Enclosing the bottom of the base 103 is understood not to mean that the floor must seal the bottom. The floor 202 may be constructed to seal the bottom. The upper extension 203 extends distally away from the floor 202. The upper extension 203 may comprise of an inner core 204 and at least one outer arm 205. One or more cells are created between the inner core 204 and at least one outer arm 205. In FIG. 2, there are 21 outer arms displayed. There may be one less outer arm than the number of cells. In such a configuration, there is a vertical slot 104 between each outer arm 205. A vertical slot 104 may sized to allow for a hook 501 to fit. Fitting means a hook 501 may be inserted through the vertical slot 104 or slid along the vertical slot 104.

An inner slot 206 may be configured between each outer arm 205 and the inner core 204. The inner slot 206 may connect two cells. For example, the inner slot 206 may connect the first cell 102a and the second cell 102b. The inner slot 206 may be configured to allow for a hook 501 or other object to pass through. The outer arm 205 may be configured to flex by nature of having a vertical slot 104 on each side and an inner slot 206. Configuring the outer arm 205 to flex may allow for a top 106 or a case 1001 to snap to the base 103. A cartridge 101 may be constructed without an inner slot 206. When the cartridge 101 is constructed with no inner slot 206, the outer arm 205 and the inner core 204 may be comprised of material connecting the inner core 204 and the inner core 204.

The base 103 may be configured with a closed block 207. The closed block 207 is a location on the base 103 where there is not a cell 102. The top 106 may be rotated such that the opening 107 is over the closed block 207. When the opening 107 is over the closed block 207, no bait 401 may be removed from a cell 102 and all of the cells are closed so that bait 401 may not fall out of the cells.

Figure 3:
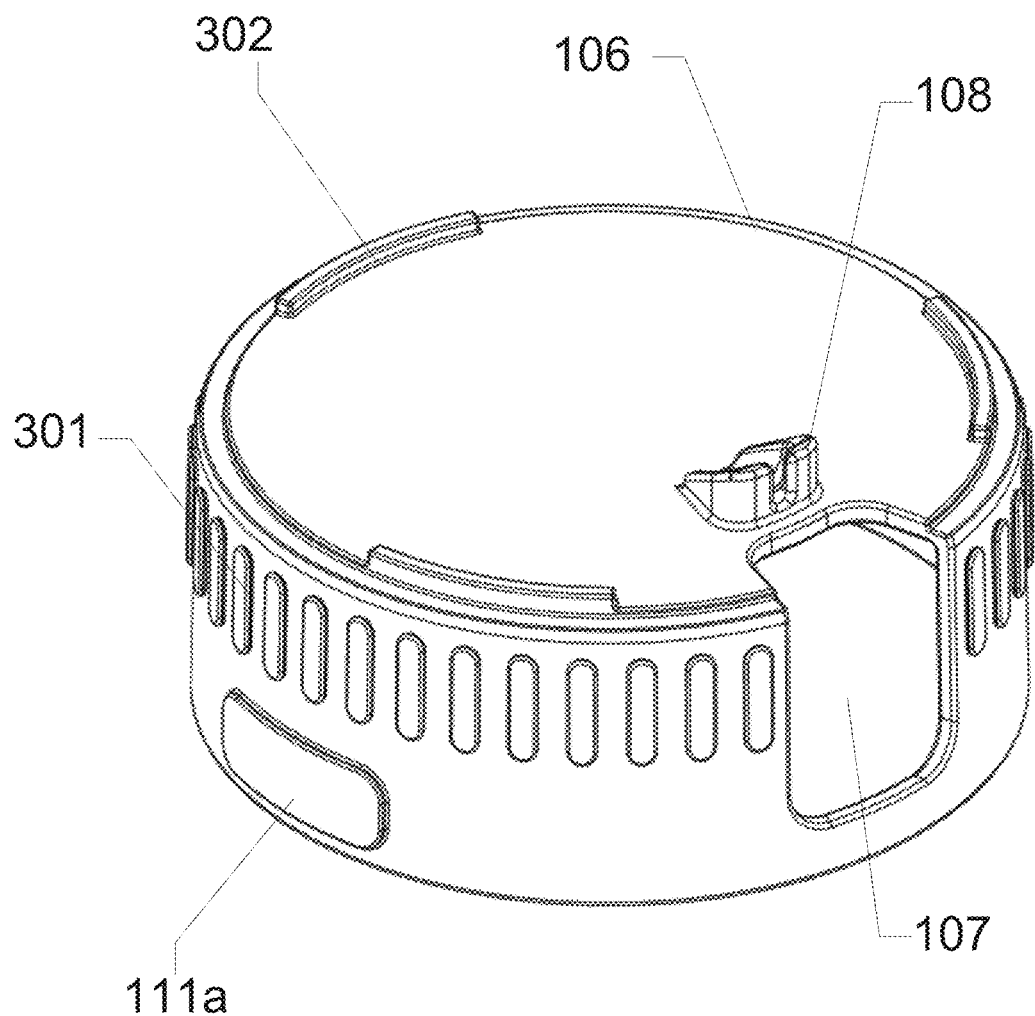
FIG. 3 shows a 3D perspective of a fishing bait cartridge top.

FIG. 3 shows a 3D perspective of a fishing bait cartridge 101 top 106. The top 106 may comprise of an opening 107. The opening 107 may be moved to allow access to each individual cell 102 or multiple cells when the top 106 is attached to the base 103. The top 106 is adjustably attached to the base 103. The top 106 may be configured with grips 301 to allow for ease of use by a fisher. A bait stop 108 may be configured on the top 106. The bait stop 108 may be molded on the component or attached using other means such as glue or other fasteners.

The top 106 may have ridges 302 that allow for multiple cartridges to be stacked. The ridges 302 may be configured to connect to the bottom of a second cartridge. The connection may be such that force is need to separate the cartridges or it may be such that the cartridges simply rest upon each other. The ridges 302 on the top 106 may mate with the bottom stand 404 of a second cartridge. The bottom stand 404 of a cartridge 101 may extend such that a bait stop 108 on the top 106 or the base 103 does not interfere with multiple cartridges stacked upon each other. The bottom stand 404 may alternatively be configured to connect to a bottom stand 404 of a second cartridge. In such a configuration, two cartridges may be used while connected together.

Figure 4A:
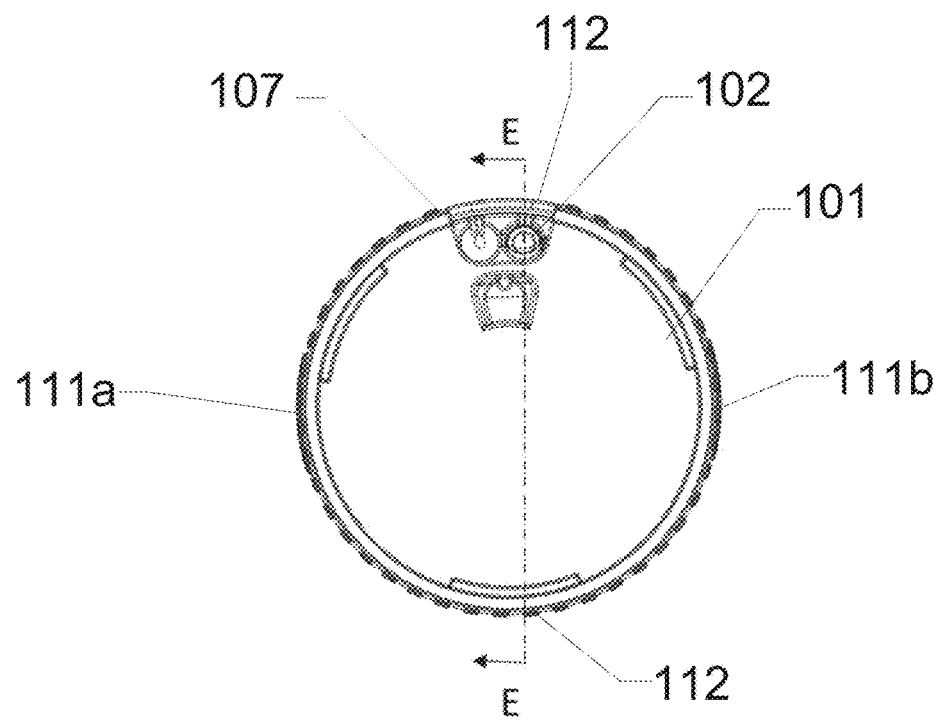
FIG. 4a shows a top perspective of a fishing bait cartridge.

FIG. 4a shows a top perspective of a fishing bait cartridge 101. In the figure, the opening 107 can be seen allowing access to two cells. Line E-E is shown to designate a cross-section for FIG. 4b.

Figure 4B:
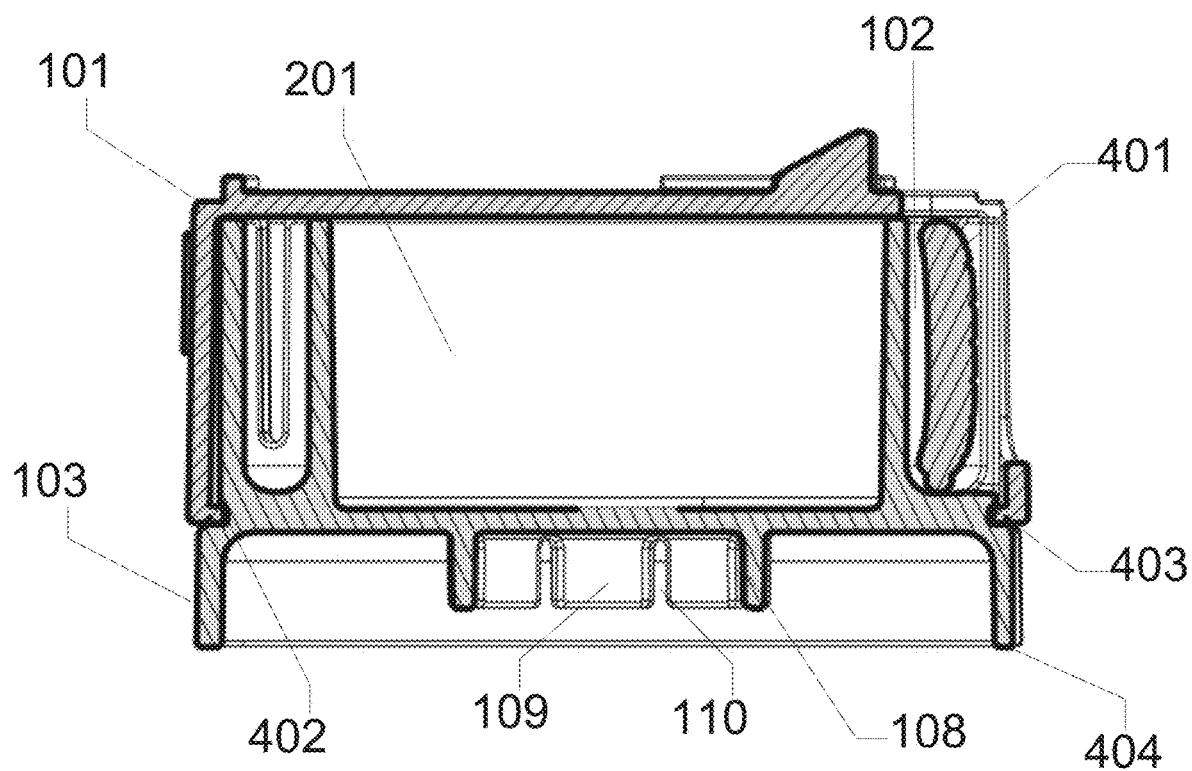
FIG. 4b shows a cross-section of a fishing bait cartridge.

FIG. 4b shows a cross-section of a fishing bait cartridge 101. The cross-sectional view is along line E-E as shown in FIG. 4a. The top 106 is attached to the base 103. The base 103 as shown in FIG. 3 has a notch 402. The notch 402 may be configured radially around the base 103. For example, the notch 402 may be cut radially around the base 103. The top 106 may as a part have a tab 403. The tab 403 may extend around the circumference of the top 106. The tab 403 and the notch 402 may be configured to adjustably attach together. When the tab 403 is attached to the notch 402, the top 106 and the base 103 may rotate relative to each other. This rotation allows for the opening 107 on the top 106 to be adjustably aligned to allow access to different cells when the opening 107 is over a cell 102. The tab 403 may extend the entire circumference of the top 106 or the top 106 may be configured with a tab 403 that is at only portions of the top 106. Alternatively, the top 106 may be configured with a notch and the base configured with a tab. Alternative means to attach the top 106 to the base 103 may also be used.

The top 106 may be constructed from a flexible material such that the top 106 may flex around its circumference thereby allowing the tab 403 to move in relation to the notch 402. Alternatively, the base 103 may be constructed from a flexible material such that the base 103 may flex around its circumference thereby allowing the notch 402 to move in relation to the tab 403. If the tab 403 and notch 402 could not move relative to each other, it may be difficult to remove the top 106 from the base 103. An example of flexible material may be a plastic or a rubber. Utilizing flexible material in either the base 103 or the top 106 is one embodiment wherein the top 106 is considered attached to the base 103 using a flex attachment member. Alternative flex attachment members may include an attachment configuration wherein a portion of the base extends upward from the base 103 to a location on the top that is configured to flexibly secure to the portion of the base extending upward.

A bait 401 is shown in FIG. 4b loaded into a cell 102. The bait 401 as displayed may, for example, be a wax worm.

The base 103 may be further comprised of a bait stop 108. The bait stop 108 is shown in a different configuration as compared to the bait stop 108 shown on the top 106. A bait stop 108 may be comprised of a surface 109 and a hook pass 110. The bait stop 108, as shown on the base 103, may have multiple hook passes through which a hook 501 may pass. A corresponding surface 109 is also present. As shown in FIG. 4b, the bait stop 108 is circular in shape. Other embodiments may use different shapes. A central pocket 201 may be configured into the base 103.

Figure 5:
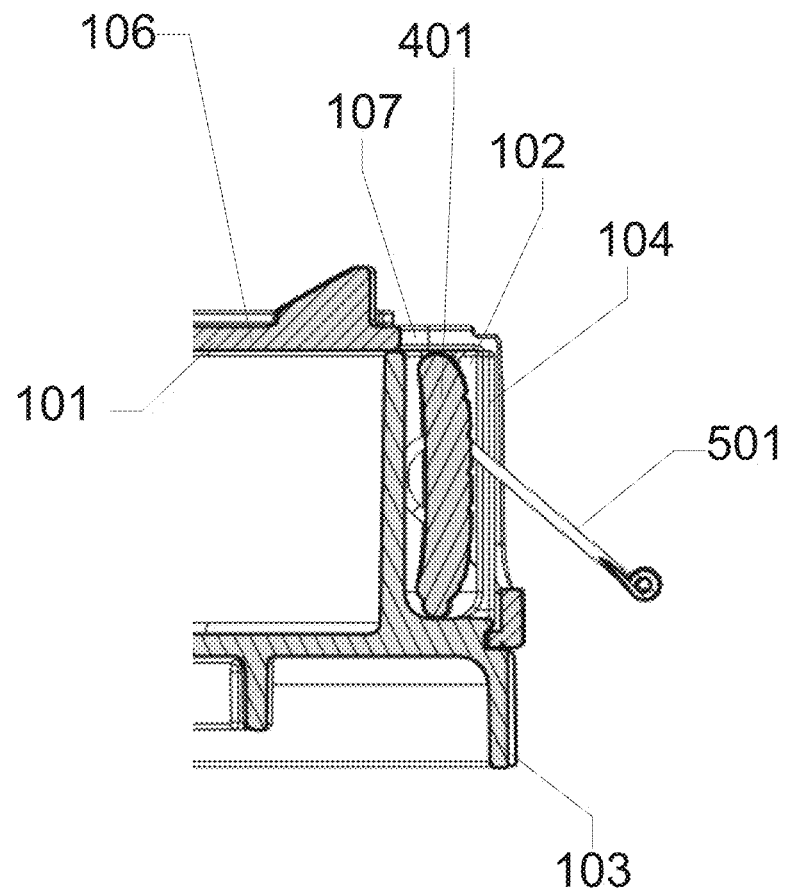
FIG. 5 shows a cross-section of a fishing bait cartridge with a hook inserted in a vertical slot.

FIG. 5 shows a cross-section of a fishing bait cartridge 101 with a hook 501 inserted in a vertical slot 104. The top 106 is attached to the base 103. A bait 401 can be seen in a cell 102. The hook 501 is inserted through the vertical slot 104 and the bait 401 is installed on the hook 501. The bait 401 may have been installed by pressing a point on the hook 501 through the bait 401 such that the bait 401 is installed on the hook 501 as desired by the fisher. The hook 501 along with the bait 401 may be raised out of the cell 102 and the cartridge 101 through the opening 107.

Figure 6A:
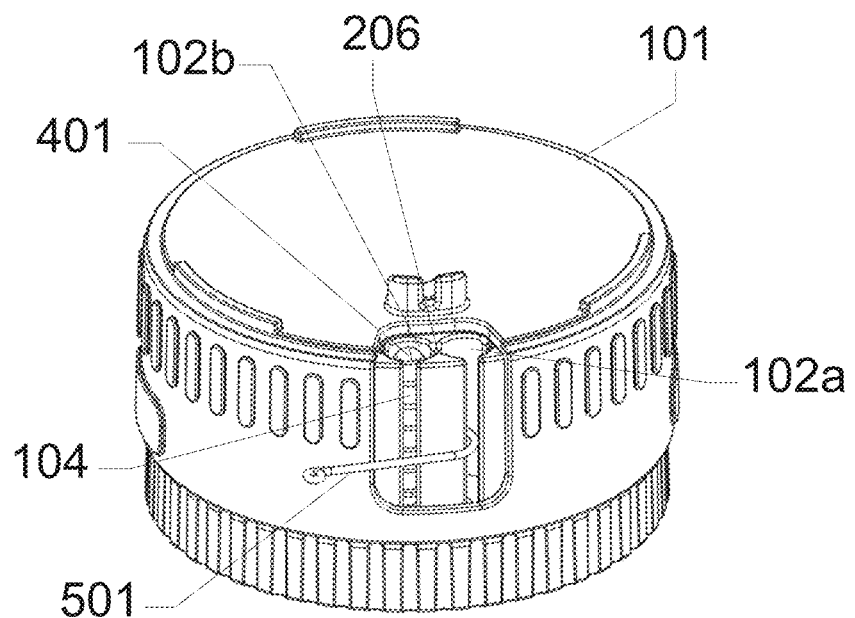
FIG. 6a shows a 3D perspective of a fishing bait cartridge with a hook inserted in an inner slot.

FIG. 6a shows a 3D perspective of a fishing bait cartridge 101 with a hook 501 inserted in an inner slot 206. The top 106 is attached to the base 103. A bait 401 can be seen in a cell 102. The hook 501 is inserted through the vertical slot 104 corresponding with a first cell 102a, extending through an inner slot 206 between the first cell 102a and a second cell 102b, and into the bait 401. The configuration of cells, vertical slot 104, and inner slot 206 allows for the bait 401 to be installed on the hook 501 such that the hook enters into the bait 401 from the side. If only a vertical slot 104 was configured in the base 103, the hook 501 likely could only be installed along the length of a bait 401. A fisher may have different fishing techniques that require different methods in which the bait 401 is installed on a hook 501.

Figure 6B:
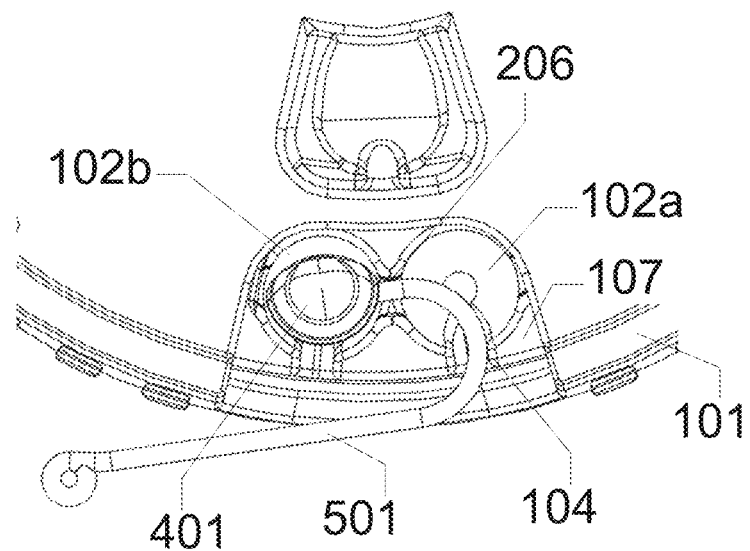
FIG. 6b shows a portion of the top perspective of a fishing bait cartridge with a hook inserted in an inner slot.

FIG. 6b shows a portion of the top perspective of a fishing bait cartridge 101 with a hook 501 inserted in an inner slot 206. FIG. 6b is a top perspective of FIG. 6a. The opening 107 is adjustably configured to provide access to both the first cell 102a and the second cell 102b. Allowing access to both the first cell 102a and the second cell 102b allows for the hook 501 with a bait installed 401 to be removed upwards out of the cells.

Figure 7:
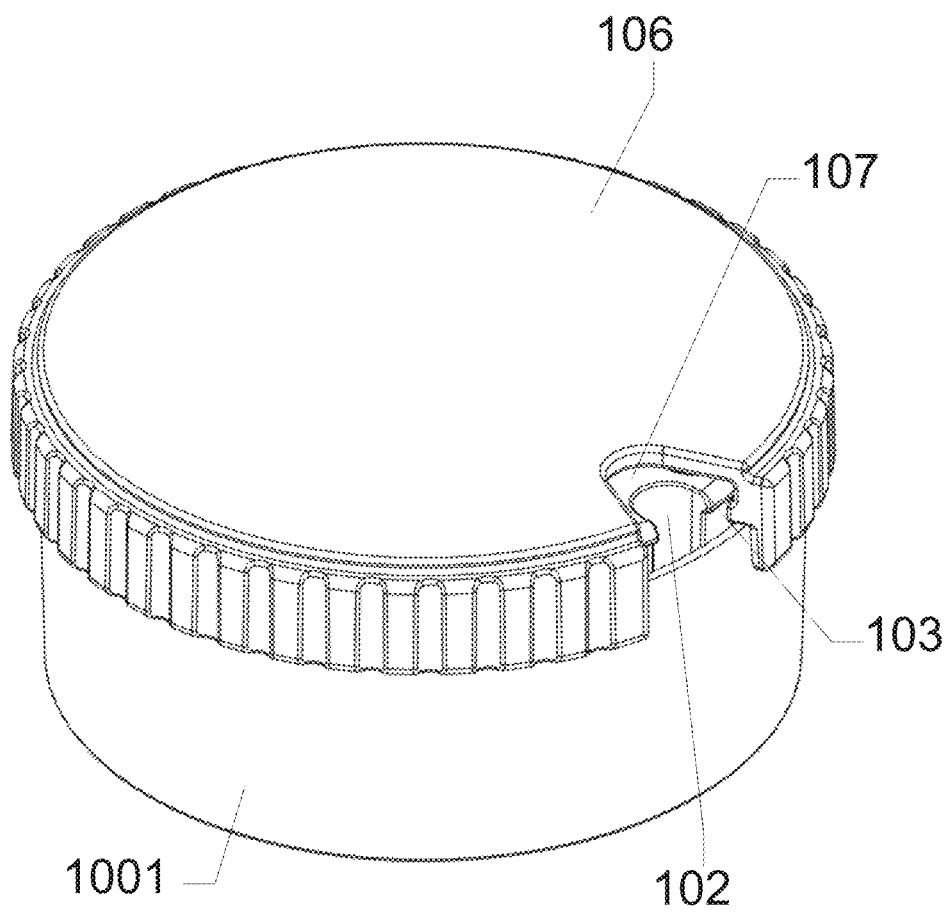
FIG. 7 shows a 3D perspective of a fishing bait cartridge in a different embodiment.

FIG. 7 shows a 3D perspective of a fishing bait cartridge 101 in a different embodiment. The embodiment as shown is comprised of a top 106, a base 103, a case 1001, an opening 107, and a cell 102. In this embodiment, the top 106 may rotate relative to the base 103 and the case 1001. The rotation allows for the opening 107 to adjustably allow access to whichever cell 102 is desired by the fisher. The opening 107 may be sized such that one cell 102 is provided access. The opening 107 may be configured for one cell 102 or for more than one cell 102. For example, an opening 107 may provide for access to five cells, two cells, one cell, or any other number.

Figure 8:
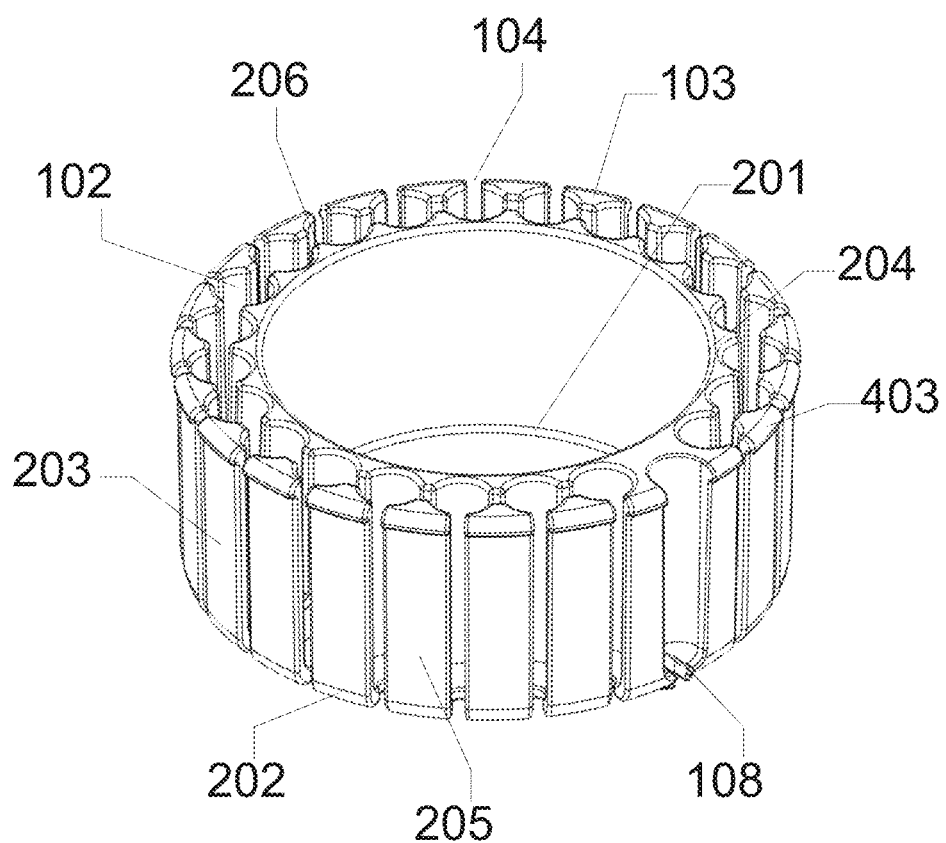
FIG. 8 shows a 3D perspective of a fishing bait cartridge base as in one alternative embodiment.

FIG. 8 shows a 3D perspective of a fishing bait cartridge 101 base 103 as in the alternative embodiment shown in FIG. 7. The base 103 may be comprised of an inner core 204, one or more outer arms, one or more cells, one or more vertical slots, and a floor 202. The base 103 may be further comprised of inner slots and a central pocket 201. The floor 202 represents the bottom of the base 103. Each cell 102 may be configured to hold at least one bait 401. A cell 102 could be configured to hold multiple baits. The base 103 in the shown embodiment is separate from the case 1001. The base 103 may secure to the case 1001 or it may simply rest within the case 1001. A bait stop 108 may be configured within the base 103.

The height of the base 103 may be configured in any size to accommodate for different types of baits. For example, a cartridge 101 configured to hold minnows might be 8.00 cm (3.14 in), whereas a cartridge configured to hold a wax worm might have a height of 2.54 cm (1.00 in). The cells may also change in size to accommodate for different sized bait 401. For example, a wax worm requires a smaller cell, whereas a minnow may require a larger cell. A wax worm cell 102 may have a cell 102 with a diameter less than 1.00 cm (0.39 in), whereas a minnow cell 102 may have a cell 102 with a diameter greater than 1.00 cm (0.39 in).

Each outer arm 205 may flex. An outer arm 205 may be attached to the floor 202 and on each side a vertical slot 104 or an inner slot 206 may isolate the outer arm 205 from other structural support. This isolation may allow the outer arm 205 to flex. The base 103 as shown in FIG. 8 may have a tab 403 around the circumference. The tab 403 may be attached to each outer arm 205. The flex of the outer arm 205 allows for a top 106 and a corresponding notch 402 on the top 106 to attach to the base 103 using the notches on the outer arms. Each outer arm 205 need not have a tab 403, rather the tab 403 may be positioned at various points along the circumference. Alternatively, other methods besides the tab 403 and notch 402 may be used to attach the top 106 to the base 103. Further, the tab 403 may be at any location on the base 103 and need not be located only at the most distal location of the upper extension 203 relative to the floor 202.

Figure 9:
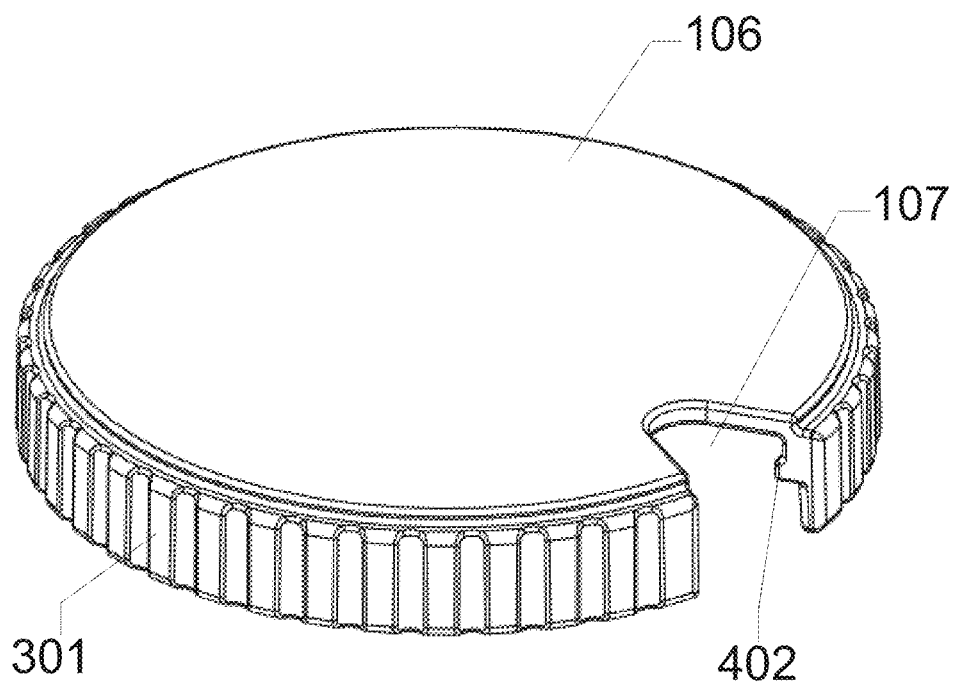
FIG. 9 shows a 3D perspective of a fishing bait cartridge top as in one alternative embodiment.

FIG. 9 shows a 3D perspective of a fishing bait cartridge 101 top 106 as in the embodiment shown in FIG. 7. The top 106 may have an opening 107. The top 106 may rotate relative to the base 103 when the top 106 is attached to the base 103. The top 106 may have grips 301 for a fisher to use when rotating or grasping the top 106. As shown in FIG. 9, a notch 402 may be configured in the top 106. The notch 402 is configured to attach to the tab 403.

Figure 10:
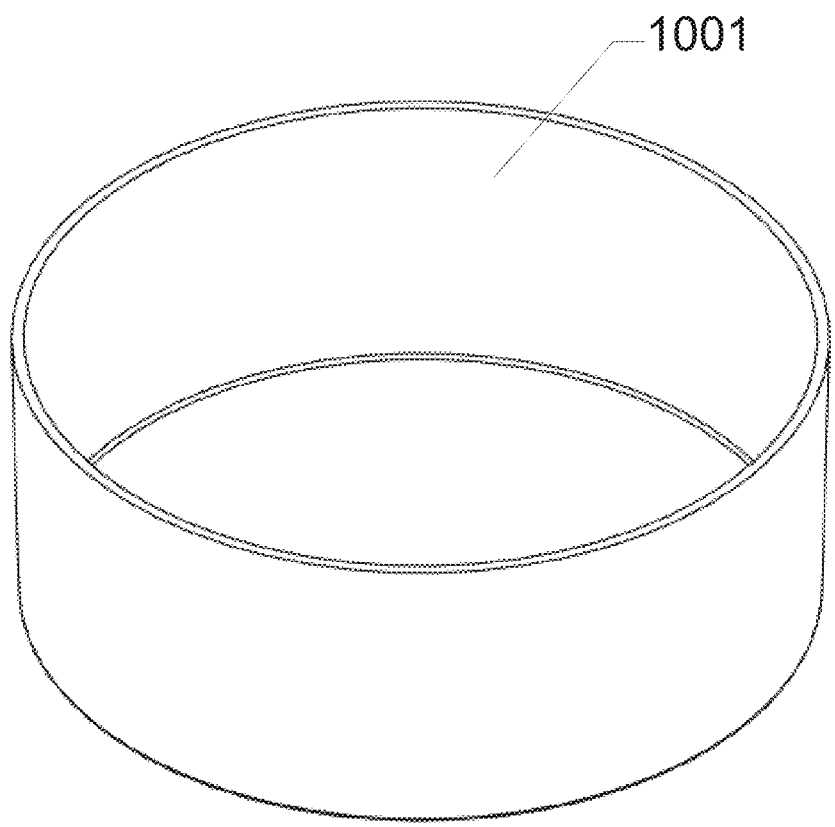
FIG. 10 shows a 3D perspective of a fishing bait cartridge case as in one alternative embodiment.

FIG. 10 shows a 3D perspective of a fishing bait cartridge 101 case 1001 as in as in the embodiment shown in FIG. 7. The case 1001 may be configured to contain the base 103 and attach to the top 106. Alternatively, the case 1001 may attach to the base 103 and not attach to the top 106.

Figure 11:
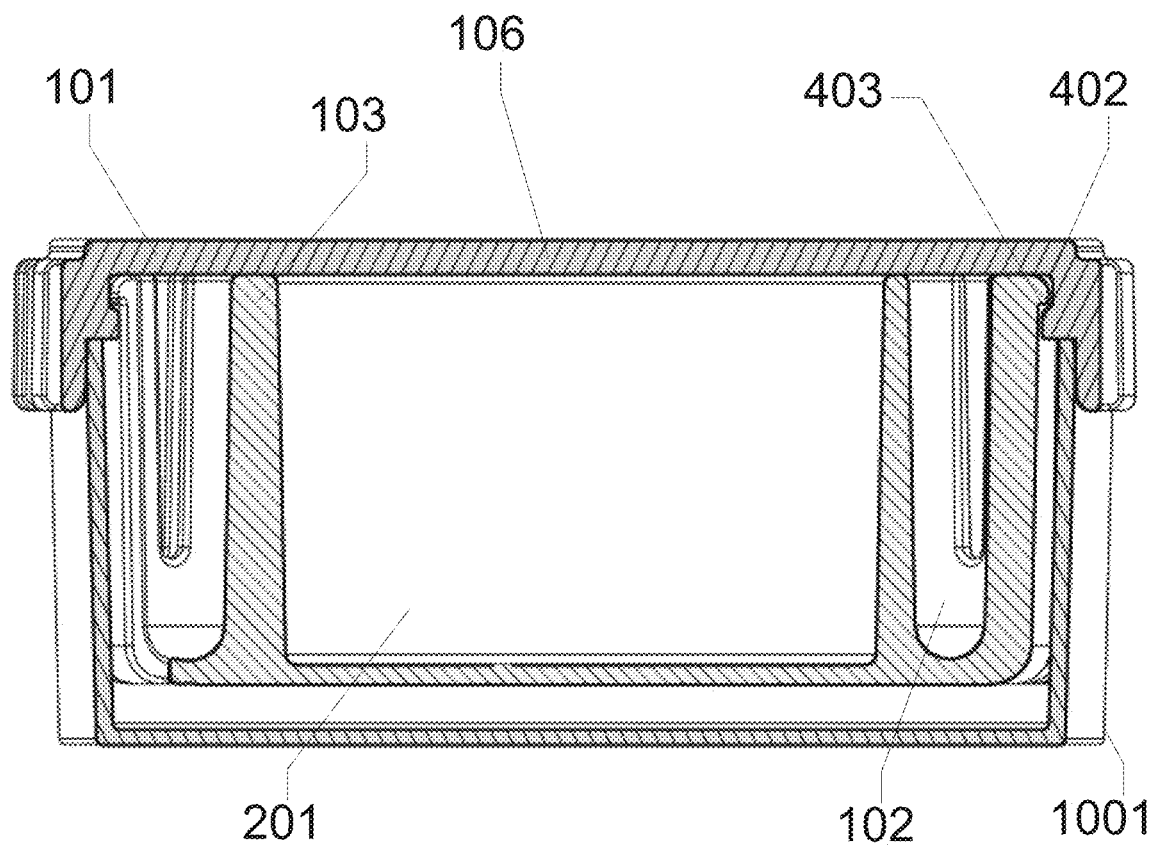
FIG. 11 shows a cross-section of a fishing bait cartridge as in one alternative embodiment.

FIG. 11 shows a cross-section of a fishing bait cartridge 101 as in the embodiment shown in FIG. 7. The base 103 is shown attached to the top 106 using a notch 402 on the top 106 and a tab 403 on the base 103. The case 1001 is attached to the top 106 and the base 103.

The cartridge 101 may be shaped linearly rather than as a circle when viewing the cartridge 101 from a top perspective. As shown in FIGS. 1-13, the cartridge 101 is in the shape of a circle.

Figure 12:
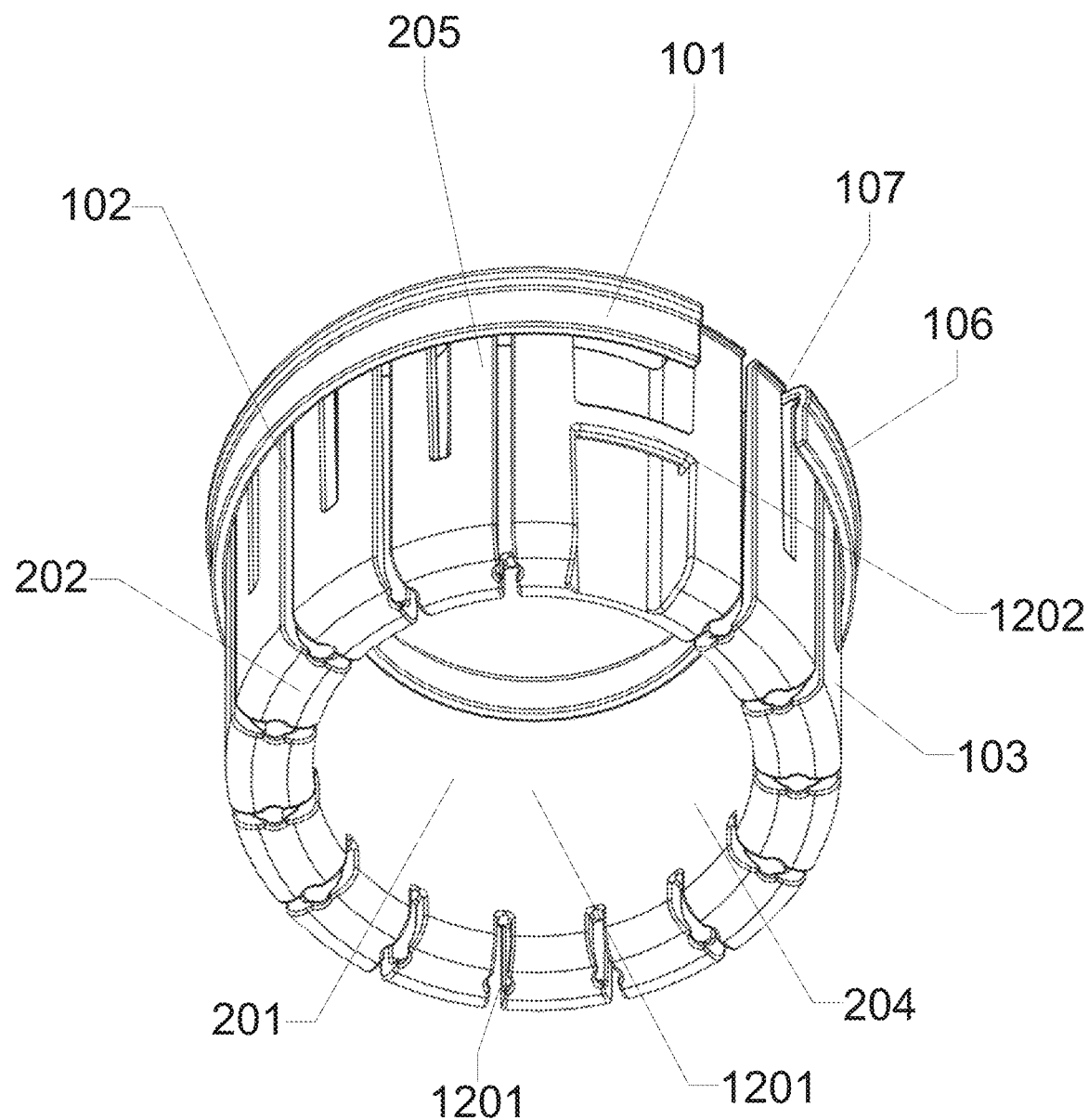
FIG. 12 shows a 3D perspective of a fishing bait cartridge in an embodiment that may be used with leeches.

FIG. 12 shows a 3D perspective of a fishing bait cartridge 101 in an embodiment that may be used with leeches. Each cell 102 may be constructed in an ellipse shape to conform to the shape of a leech. The ellipse shape may have a long axis that is perpendicular to the radial direction from the center axis of the cartridge 101. Alternatively, the ellipse shape may have a short axis that is perpendicular to the radial direction from the center axis of the cartridge 101 to accommodate for other types of bait 401. For example, a minnow used as a bait 401 may work better with a short axis perpendicular to the radial direction from the center axis of the cartridge 101.

The cartridge 101 may be configured such that a cell 102 may extend in part through the floor 202. A hook 501 may enter one end of the cell 102 and exit out of the other end. In effect, a bottom hole 1201 may be placed in the floor 202 enclosing the end of the cell 102. Further the floor 202 of the central pocket 201 may be removed to allow for objects and fluid to pass through the cartridge 101. The top 106 may have a corresponding hole in the center to match the removed section of floor 202 corresponding to the central pocket 201. A hole in the center of the top 106 may allow for easy gripping of the top 106 when rotating the top 106 in relation to the base 103.

A dimple 208 may be placed on an outer arm 205 such that it interfaces with the top 106. The dimple 208 may be a raised point on the base 103, may be a groove, or other manner of interface with the top 106. As the top 106 rotates the dimple may cause a noise to be made or resistance when the top 106 is rotated to certain points in relation to the base 103. The dimple 208 may cause the opening 107 on the top 106 to rest directly over one or more cells. The cartridge 101 may be configured with the dimple 208 such that resistance occurs when the opening 107 is in a desired location over one or more cells.

A hook point 1202 may be configured on the cartridge 101. A hook point 1202 may be such that a key ring, lanyard, hook, or other device may connect to the hook point 1202. The cartridge 101 may be carried with the hook point 1202. The hook point 1202 may be attached at any location on the cartridge 101.

A cell 102 may be configured with additional slots to allow access to the bait by a hook 501 from different angles. For example, an additional slot on the upper portion of the inner core 204 may be placed to allow for a hook 501 to access the bait 401 coming from the direction of the inner core 204. Such slot may be slanted downward from the inner core 204 to the outside surface of the base 103.

Figure 13:
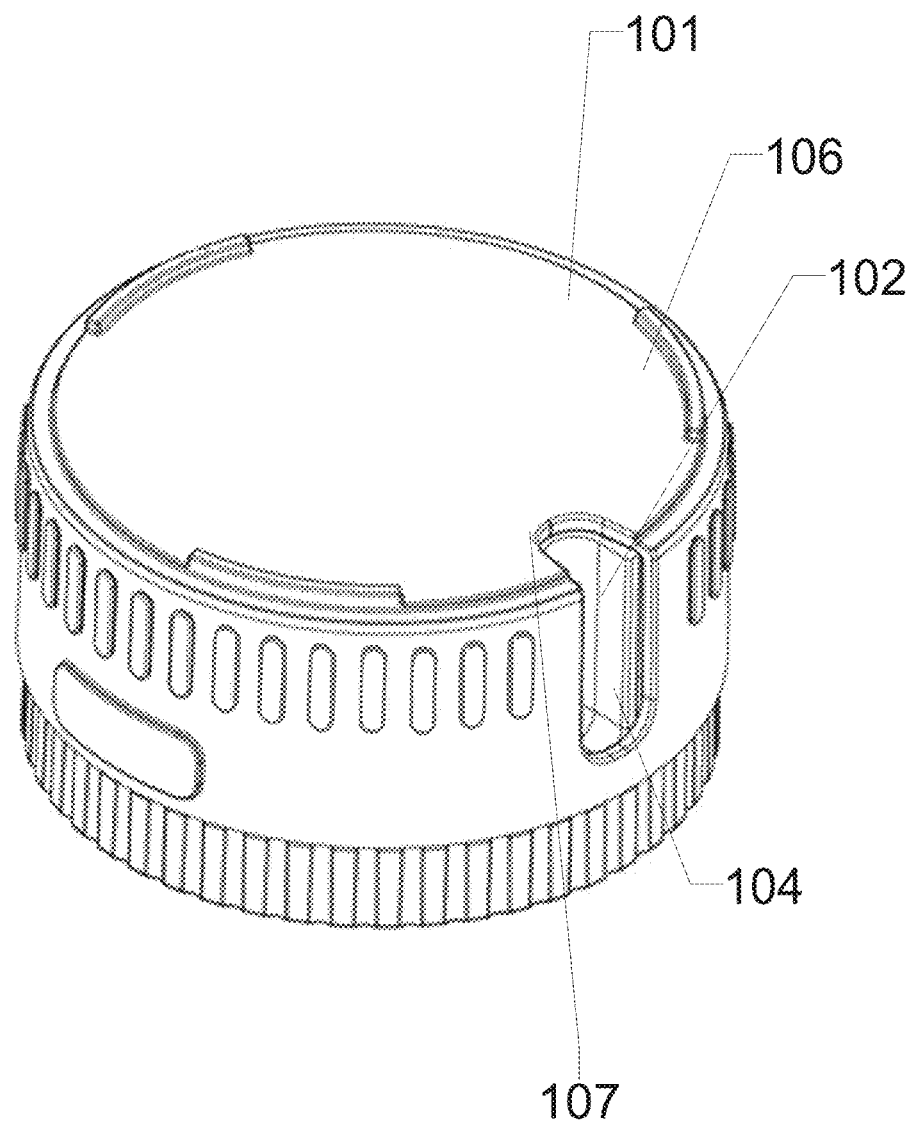
FIG. 13 shows a 3D perspective of a fishing bait cartridge in an embodiment with a widened vertical slot.

FIG. 13 shows a 3D perspective of a fishing bait cartridge 101 in an embodiment with a vertical slot 104 that is widened. A vertical slot 104 that is widened allows for a bait 401 to be removed from a cell 102 in a direction that is perpendicular to the inner core 204. When the vertical slot 104 is constructed such that the vertical slot 104 is slightly larger than a hook 501, a bait 401 might not be easily removable in a direction perpendicular to the inner core 204. A vertical slot 104 that is widened may be useful for certain types of baits. As shown in FIG. 13, the vertical slot 104 is widened to such an extent that the vertical slot 104 is as wide as the diameter of the cell 102 on the axis that is perpendicular to the radial direction from the center axis of the cartridge 101.

A vertical slot 104 that is widened may be used on a cartridge 101 that has a top 106 with an opening 107 that is similar in size comparatively to the vertical slot 104 that is widened. When the opening 107 is configured to be over a cell 102 with a vertical slot 104 that is widened, a bait 401 may fall out of the cell 102 if the cartridge 101 is not positioned to accommodate for gravitational forces. A cartridge 101 may be comprised of multiple cells having vertical slots with varying widths. For example, a cartridge 101 may have a first cell with a vertical slot 104 slightly wider than a hook 501 and a second cell with a vertical slot 104 that is widened to an extent the vertical slot 104 is as wide as the cell 102. A vertical slot 104 may have a varying width. For example, the portion of the vertical slot 104 that is close to the floor 202 might have a width similar to the size of a hook 501 and the portion of the vertical slot 104 that is further from the floor 202 might have a width widened to an extent the vertical slot 104 is as wide as the cell. The cartridge 101 may be constructed with a vertical slot 104 with any variation of varying widths. A varying width may retain a bait 401 more effectively than a vertical slot 104 with a width that is as wide as the cell 102. A bait 401 may curl onto a hook 501 due to the use of a varying width.

Figure 14:
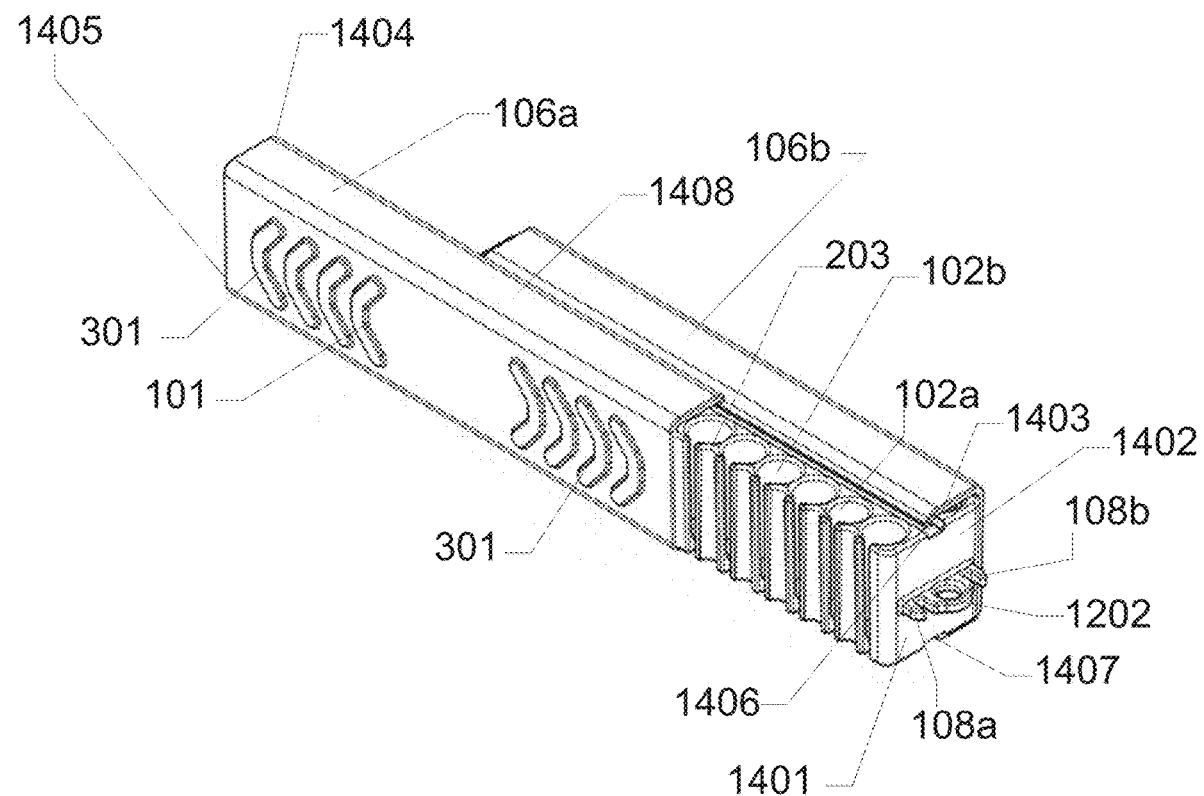
FIG. 14 shows a 3D perspective of a fishing bait cartridge in a linear embodiment.

FIG. 14 shows a 3D perspective of a fishing bait cartridge 101 in a linear embodiment. The cartridge 101 in FIG. 14 is comprised of a base 103, a first top 106a, and a first cell 102a. The cartridge 101 in FIG. 14 is further comprised of a second cell 102b, a second top 106b, a first bait stop 108a, a second bait stop 108b, a hook point 1202, and grips 301. The cartridge 101 may be in a rectangle shape from a top perspective. The rectangle shape allows for the top 106 and the base 103 to move in a linear direction relative to each other rather than a rotational direction as explained with FIGS. 1-13. The movement allows for the first cell 102a and other to be accessed.

The base 103 may be comprised of a first half 1401 and a second half 1402. The first half 1401 may be comprised of the first cell 102a and a second cell 102b. The first top 106a may move relative to the cartridge 101 such that the first half 1401 may be covered by the first top 106a. The first top 106a may be constructed such that it may cover the cells located on the first half 1401 and not the cells located on the second half 1402. The first top 106a may cover the cells with a top surface 1408. The base 103 may be comprised of a first cell 102a and an upper extension 203. The upper extension 203 may extend from a lower groove 1407 to an upper groove 1406.

The first top 106a may be constructed in a shape that roughly resembles a "C". The first top 106a may have an upper ridge 1404 and a lower ridge 1405. The upper ridge 1404 and the lower ridge 1405 may be constructed to interface with the base 103. The interface allows for the first top 106a to flexibly attach to the base 103. The first top 106a may be flexible. A first top 106a that is flexible may be considered a flex attachment member for the purpose of attaching to the base 103. The upper ridge 1404 may rest in an upper groove 1406 when attached to the base 103. The first top 106a may have ends that are opened or closed on one or both ends. Grips 301 may be constructed on each top or on the base 103.

The cartridge 101 may be further comprised of a slider stop 1403. The slider stop 1403 may be positioned at a point along the upper groove 1406. The slider stop 1403 may be constructed such that the upper ridge 1404 may interface with the slider stop 1403 to an extent the first top 106a may be restricted from linearly sliding to a certain location relative to the base 103. Alternatively the slider stop 1403 may be position along the lower groove 1407 or at some other point on the base 103. A slider stop 1403 may be a piece of material that extends into the sliding path of the first top 106a.

The second half 1402 may be comprised of the third cell and a fourth cell. The second top 106b may move relative to the cartridge 101 such that the second half 1402 may be covered by the second top 106b. The second top 106b may be constructed such that it may cover the cells located on the second half 1402 and not the cells located on the first half 1401. The second half 1402 and second top 106b may be constructed similar to how the first half 1401 and the first top 106a is described herein. All the features of the first half 1401 and the first top 106a, such as the use of a slider stop 1403, may be used for the second half 1402 and the second top 106b. The first top 106a or the second top 106b may be referenced as a top 106.

Explanation of Exemplary Language

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof.

Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A fishing bait cartridge device comprising:
a base, the base comprising a first cell, a second cell, a floor, and an upper extension, the first cell having a first vertical slot, the second cell having a second vertical slot, the first cell and the second cell each configured to store a bait, the upper extension comprising an inner core and an outer arm; and
a top, the top comprising an opening, the top adjustably attached to the base using a flex attachment member, the top may move relative to the base, the opening allows access to the first cell when the opening is over the first cell and access to the second cell when the opening is over the second cell; and
an inner slot, the inner slot configured between the outer arm and the inner core, the inner slot connects the first cell and the second cell.

2. The fishing bait cartridge of claim 1, wherein the base and the top is shaped as a circle from a top perspective, the top moves by rotating relative to the base.

3. The fishing bait cartridge of claim 1, wherein the bait can be installed on a hook by inserting the hook into the first cell and into the bait, the hook along with the bait when installed on the hook can be removed from the first cell through the opening.

4. The fishing bait cartridge of claim 1, further comprising a bait stop on the top.

5. The fishing bait cartridge of claim 1, further comprising a bait stop on the base.

6. The fishing bait cartridge of claim 1, further comprising a notch and a tab, the notch configured radially around the base, the tab a part of the top, the tab and the notch to adjustably attach together.

7. The fishing bait cartridge of claim 1, further comprising a notch and a tab, the notch configured radially around the top, the tab a part of the base, the tab and the notch to adjustably attach together.

8. The fishing bait cartridge of claim 1, further comprising grips on the top.

9. The fishing bait cartridge of claim 1, the base further comprising a closed block.

10. A fishing bait cartridge device comprising:
a base, the base comprising a first cell, a second cell, a floor, and an upper extension, the first cell having a first vertical slot, the second cell having a second vertical slot, the first cell and the second cell each configured to store a bait;
a top, the top comprising an opening, the top adjustably attached to the base using a flex attachment member, the top may move relative to the base, the opening allows access to the first cell when the opening is over the first cell and access to the second cell when the opening is over the second cell;
a central pocket in the base; and
a strainer, the strainer placed in the central pocket.

11. A fishing bait cartridge device comprising:
a base, the base comprising a first cell, a second cell, a floor, and an upper extension, the first cell having a first vertical slot, the second cell having a second vertical slot, the first cell and the second cell each configured to store a bait, the upper extension comprising an inner core and an outer arm, the base further comprising a bottom stand, the top further comprising ridges, the bottom stand configured to mate with the ridges; and
a top, the top comprising an opening, the top adjustably attached to the base using a flex attachment member, the top may move relative to the base, the opening allows access to the first cell when the opening is adjacent to the first cell and access to the second cell when the opening is adjacent to the second cell.

12. A fishing bait cartridge device comprising:
a base, the base comprising a first cell, a second cell, a floor, and an upper extension, the first cell having a first vertical slot, the second cell having a second vertical slot, the first cell and the second cell each configured to store a bait, the upper extension comprising an inner core and an outer arm;
a top, the top comprising an opening, the top adjustably attached to the base using a flex attachment member, the top may move relative to the base, the opening allows access to the first cell when the opening is over the first cell and access to the second cell when the opening is over the second cell;
a central pocket in the base; and
a dimple placed on the outer arm that interfaces with the top.

13. A fishing bait cartridge device comprising:
a base, the base comprising a first cell, a floor, and an upper extension, the first cell having a first vertical slot, a second cell, an inner slot, a central pocket, a closed block, a bottom stand, and a notch, the first cell is configured to store a bait, the first vertical slot sized to fit a hook, the second cell having a second vertical slot, the upper extension comprising an inner core and an outer arm, the inner slot configured between the outer arm and the inner core, the inner slot connects the first cell and the second cell; and
a top, the top comprising an opening, a tab, grips, ridges, a release button, and a bait stop, the top adjustably attached to the base using a flex attachment member, the top may rotate relative to the base, the opening allows access to the first cell when the opening is over the first cell, the base and the top is shaped as a circle from a top perspective, the bait can be installed on the hook by inserting the hook into the first cell and into the bait, the hook along with the bait when installed on the hook can be removed from the first cell through the opening, the notch configured radially around the base, the tab a part of the top, the tab and the notch to adjustably attach together, the bottom stand configured to mate with the ridges, the top and the base are constructed from only two pieces.

14. A fishing bait cartridge device comprising:
a base, the base comprising a plurality of cells, each of the plurality of cells having a vertical slot, each of the plurality of cells configured to store a bait; and
a top rotatable relative to the base, the top movement allows for two of the plurality of cells to be exposed through an opening in the top, wherein a hook is receivable through the vertical slot in a cell adjacent to a cell which contains a bait to access the bait.

15. The fishing bait cartridge of claim 14, wherein the base is permeable.

16. The fishing bait cartridge of claim 14, wherein the base and the top are shaped as a circle from a top perspective.

* * * * *